United States Patent
Ollila (10) Patent No.: US 10,701,342 B2
(45) Date of Patent: Jun. 30, 2020

(54) IMAGING SYSTEM AND METHOD FOR PRODUCING IMAGES USING CAMERAS AND PROCESSOR

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 156 days.

(21) Appl. No.: 15/898,445

(22) Filed: Feb. 17, 2018

(65) Prior Publication Data

US 2019/0260981 A1    Aug. 22, 2019

(51) Int. Cl.
*H04N 13/25* (2018.01)
*G02B 27/01* (2006.01)
(Continued)

(52) U.S. Cl.
CPC ......... *H04N 13/25* (2018.05); *G02B 27/0172* (2013.01); *G02B 27/0176* (2013.01); *G09G 3/002* (2013.01); *H04N 13/344* (2018.05)

(58) Field of Classification Search
CPC ............... G09G 3/002; G09G 2300/02; G09G 2340/04; G09G 2340/0442; G09G 2340/045; G09G 2340/0464–0485; G09G 2340/12; G09G 2340/125; H04N 13/0074; H04N 13/0081; H04N 13/0085; H04N 13/0096; H04N 13/106–117;
(Continued)

(56) References Cited

U.S. PATENT DOCUMENTS 5,905,525 A    5/1999  Ishibashi et al.
5,978,015 A *  11/1999 Ishibashi ............... H04N 13/344
                                                     348/47

(Continued)

FOREIGN PATENT DOCUMENTS

EP    3229106 A1    10/2017
WO   03/073738 A2    9/2003

OTHER PUBLICATIONS

Partial International Search Report received for International Patent Application No. PCT/FI2019/050082, dated May 7, 2019, 15 pages.

(Continued)

*Primary Examiner* — Nathan Danielsen
(74) *Attorney, Agent, or Firm* — Ziegler IP Law Group LLC (57) ABSTRACT

An imaging system for producing images to be displayed to user via a head-mounted display apparatus that includes means for detecting gaze direction of user. The imaging system includes a first outer camera and a second outer camera, at least one inner camera, and processor coupled to aforesaid cameras and means for detecting gaze direction. The processor is configured to (i) obtain inter-pupillary distance of user with respect to user's gaze at infinity; (ii) receive detected gaze direction; (iii) control first outer camera, second outer camera and at least one inner camera to capture first outer image, second outer image and at least one inner image of a scene; and (iv) process first outer image and inner image to generate first view of the scene, and process second outer image and inner image to generate second view of the scene, based upon inter-pupillary distance and detected gaze direction.

19 Claims, 5 Drawing Sheets

(51) Int. Cl.
*G09G 3/00* (2006.01)
*H04N 13/344* (2018.01)

(58) Field of Classification Search
CPC .... H04N 13/243; H04N 13/25; H04N 13/261; H04N 13/296; H04N 13/332; H04N 13/344; H04N 13/383; H04N 13/398; G02B 27/0712; G02B 27/0176; G02B 2027/0178; G06F 3/005; G06F 3/012; G06F 3/013; G06F 3/017; G06F 3/1423–1446
See application file for complete search history.

(56) References Cited

U.S. PATENT DOCUMENTS

| | | | |
|---|---|---|---|
| 2010/0209097 A1 | 8/2010 | Sasaki et al. | |
| 2010/0259595 A1 | 10/2010 | Trimeche et al. | |
| 2012/0314937 A1* | 12/2012 | Kim | H04N 13/194 382/154 |
| 2016/0309134 A1* | 10/2016 | Venkataraman | H04N 13/243 |
| 2017/0095157 A1* | 4/2017 | Tzvieli | G02B 27/017 |
| 2017/0163932 A1 | 6/2017 | Yang et al. | |

OTHER PUBLICATIONS

International Search Report and Written Opinion received for International Patent Application No. PCT/FI2019/050082, dated Aug. 16, 2019, 22 pages.

\* cited by examiner

IMAGING SYSTEM AND METHOD FOR PRODUCING IMAGES USING CAMERAS AND PROCESSOR

TECHNICAL FIELD

The present disclosure relates generally to representation of visual information; and more specifically, to imaging systems for producing images to be displayed to users via head-mounted display apparatuses, such imaging systems comprising cameras and processors. Furthermore, the present disclosure also relates to methods of producing images to be displayed to users via head-mounted display apparatuses, such methods being implemented by the aforesaid imaging systems.

BACKGROUND

In recent times, there have been rapid advancements in development and use of technologies such as virtual reality, augmented reality, mixed reality and so forth for presenting a simulated environment to a user of a specialized device. Specifically, such simulated environments provide the user with an enhanced perception of reality around him/her, by employing contemporary techniques such as stereoscopy. Furthermore, such simulated environments relate to fully virtual environments (namely, virtual reality environments) as well as real world environments including virtual objects therein (namely, augmented reality environments, mixed reality environments). Moreover, examples of the specialized devices include virtual reality headsets, virtual reality glasses, augmented reality headsets, augmented reality glasses, mixed reality headsets, and so forth.

Typically, in such specialized devices, different two-dimensional images of a real-world scene are captured using suitable imaging equipment (for example, such as cameras). Generally, such devices include two cameras that are arranged at a distance from each other. Therefore, the different two-dimensional images represent different perspective views of the real-world scene, which are to be presented to the user's eyes. Typically such two-dimensional images allow for providing the user with a perception of three-dimensional depth within the real-world scene.

However, the existing imaging equipment have certain limitations associated therewith. Firstly, when the imaging equipment includes two cameras that are separated from each other by a fixed distance, the fixed distance is often substantially equal to an average inter-pupillary distance of humans. However, the average inter-pupillary distance of humans is not constant, and substantially varies from person to person. Notably, an inter-pupillary distance of a given user substantially changes with physical development (namely, growth) of the given user. For example, an inter-pupillary distance of a child is substantially different from that of an adult. Furthermore, the average inter-pupillary distance also varies substantially among users in a same age group. For example, a middle-aged woman may have a lesser average inter-pupillary distance as compared to a middle aged-man. Moreover, the inter-pupillary distance of the given user varies substantially with whether the user is focusing at nearby objects or far-away objects within the real world scene. The existing imaging equipment having fixed separation between the two cameras are unable to accommodate for the aforesaid variations in the inter-pupillary distance of users due to anatomical diversity therebetween, as well as variations in the inter-pupillary distance of users due to focus of the user's gaze at different objects within the real world scene. Secondly, when the imaging equipment includes two cameras that are movable for adjusting separation therebetween, physical movement of the two cameras is very cumbersome. Furthermore, an arrangement of such movable imaging equipment is complex and bulky. Moreover, such imaging equipment is unable to move the two cameras in real-time for adjusting the separation therebetween according to the focus of the user's gaze. Owing to the aforesaid limitations of conventional imaging equipment, the different two-dimensional images captured thereby, represent views of the real-world scene that are substantially different from views of the real-world scene as seen via the user's eyes. Therefore, when such images are displayed to the user (via the specialized devices) for presenting the simulated environment, the user's experience of the simulated environment is suboptimal.

Therefore, in light of the foregoing discussion, there exists a need to overcome the aforementioned drawbacks associated with imaging equipment for producing images to be presented to users of specialized devices.

SUMMARY

The present disclosure seeks to provide an imaging system for producing images to be displayed to a user via a head-mounted display apparatus in real or near real time.

The present disclosure also seeks to provide a method of producing images to be displayed to a user via a head-mounted display apparatus in real or near real time.

The present disclosure seeks to provide a solution to the existing problems associated with capturing images from a perspective of a user's eyes via conventional imaging equipment. An aim of the present disclosure is to provide a solution that overcomes at least partially the problems encountered in prior art, and provides a simple, reliable and efficient imaging system that allows for producing images substantially from a perspective of a user's eyes.

In one aspect, an embodiment of the present disclosure provides an imaging system for producing images to be displayed to a user via a head-mounted display apparatus in real or near real time, the head-mounted display apparatus comprising means for detecting a gaze direction of the user when the head-mounted display apparatus, in operation, is worn by the user, the imaging system comprising:
  a first outer camera and a second outer camera, the first outer camera and the second outer camera being arranged in a manner that a distance between the first outer camera and the second outer camera is equal to or greater than a predefined distance;
  at least one inner camera, the at least one inner camera being arranged substantially between the first outer camera and the second outer camera; and
  a processor coupled to the first outer camera, the second outer camera and the at least one inner camera, the processor being communicably coupled to said means for detecting the gaze direction of the user, wherein the processor is configured to:
    (i) obtain a given inter-pupillary distance of the user with respect to the user's gaze at infinity;
    (ii) receive, from said means, information indicative of the detected gaze direction of the user;
    (iii) control the first outer camera, the second outer camera and the at least one inner camera to capture a first outer image, a second outer image and at least one inner image of a given real-world scene, respectively, wherein the first outer image, the second outer image and the at least one inner image are to be captured substantially simultaneously; and (iv) process the first outer image and the at least one inner image to generate a first view of the given real-world scene, and process the second outer image and the at least one inner image to generate a second view of the given real-world scene, based upon the given inter-pupillary distance and the detected gaze direction of the user, wherein the first view is to be displayed to a left eye of the user, whilst the second view is to be displayed to a right eye of the user.

In another aspect, an embodiment of the present disclosure provides a method of producing images to be displayed to a user via a head-mounted display apparatus in real or near real time, the head-mounted display apparatus comprising means for detecting a gaze direction of the user when the head-mounted display apparatus, in operation, is worn by the user, wherein the method is implemented via an imaging system, the method comprising:

(i) obtaining a given inter-pupillary distance of the user with respect to the user's gaze at infinity;

(ii) receiving, from said means, information indicative of the detected gaze direction of the user;

(iii) controlling a first outer camera, a second outer camera and at least one inner camera of the imaging system to capture a first outer image, a second outer image and at least one inner image of a given real-world scene, respectively, wherein the first outer image, the second outer image and the at least one inner image are captured substantially simultaneously, the first outer camera and the second outer camera being arranged in a manner that a distance between the first outer camera and the second outer camera is equal to or greater than a predefined distance, the at least one inner camera being arranged substantially between the first outer camera and the second outer camera; and (iv) processing the first outer image and the at least one inner image to generate a first view of the given real-world scene, and processing the second outer image and the at least one inner image to generate a second view of the given real-world scene, based upon the given inter-pupillary distance and the detected gaze direction of the user, wherein the first view is to be displayed to a left eye of the user, whilst the second view is to be displayed to a right eye of the user.

Embodiments of the present disclosure substantially eliminate or at least partially address the aforementioned problems in the prior art, and enables accurate capturing of images of a given real-world scene from the perspective of the user's eyes.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 1A, 1B and 10 illustrate block diagrams of an imaging system and a head-mounted display apparatus, in accordance with various embodiments of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an imaging system for producing images to be displayed to a user via a head-mounted display apparatus in real or near real time, the head-mounted display apparatus comprising means for detecting a gaze direction of the user when the head-mounted display apparatus, in operation, is worn by the user, the imaging system comprising:

a first outer camera and a second outer camera, the first outer camera and the second outer camera being arranged in a manner that a distance between the first outer camera and the second outer camera is equal to or greater than a predefined distance;

at least one inner camera, the at least one inner camera being arranged substantially between the first outer camera and the second outer camera; and a processor coupled to the first outer camera, the second outer camera and the at least one inner camera, the processor being communicably coupled to said means for detecting the gaze direction of the user, wherein the processor is configured to:

(i) obtain a given inter-pupillary distance of the user with respect to the user's gaze at infinity;

(ii) receive, from said means, information indicative of the detected gaze direction of the user;

(iii) control the first outer camera, the second outer camera and the at least one inner camera to capture a first outer image, a second outer image and at least one inner image of a given real-world scene, respectively, wherein the first outer image, the second outer image and the at least one inner image are to be captured substantially simultaneously; and (iv) process the first outer image and the at least one inner image to generate a first view of the given real-world scene, and process the second outer image and the at least one inner image to generate a second view of the given real-world scene, based upon the given inter-pupillary distance and the detected gaze direction of the user, wherein the first view is to be displayed to a left eye of the user, whilst the second view is to be displayed to a right eye of the user.

In another aspect, an embodiment of the present disclosure provides a method of producing images to be displayed to a user via a head-mounted display apparatus in real or near real time, the head-mounted display apparatus comprising means for detecting a gaze direction of the user when the head-mounted display apparatus, in operation, is worn by the user, wherein the method is implemented via an imaging system, the method comprising:

(i) obtaining a given inter-pupillary distance of the user with respect to the user's gaze at infinity;

(ii) receiving, from said means, information indicative of the detected gaze direction of the user;

(iii) controlling a first outer camera, a second outer camera and at least one inner camera of the imaging system to capture a first outer image, a second outer image and at least one inner image of a given real-world scene, respectively, wherein the first outer image, the second outer image and the at least one inner image are captured substantially simultaneously, the first outer camera and the second outer camera being arranged in a manner that a distance between the first outer camera and the second outer camera is equal to or greater than a predefined distance, the at least one inner camera being arranged substantially between the first outer camera and the second outer camera; and (iv) processing the first outer image and the at least one inner image to generate a first view of the given real-world scene, and processing the second outer image and the at least one inner image to generate a second view of the given real-world scene, based upon the given inter-pupillary distance and the detected gaze direction of the user, wherein the first view is to be displayed to a left eye of the user, whilst the second view is to be displayed to a right eye of the user.

The present disclosure provides the aforementioned imaging system and the aforementioned method of producing images to be displayed to the user. The imaging system described herein allows for accommodating variations in inter-pupillary distance of users due to anatomical diversity therebetween. Furthermore, such an imaging system also allows for accommodating variations in the inter-pupillary distance of users due to focus of the user's gaze at different objects within the given real-world scene. Therefore, the images (namely, the first and second views of the given real-world scene) produced by such an imaging system substantially correspond to a left perspective view and a right perspective view of the given real-world scene, as seen by the user's eyes. Furthermore, the imaging system described herein is simple, compact and efficient. Beneficially, the aforesaid imaging system and method employ digital processing to produce the first and second views in real or near real time, thereby, enhancing the user's experience of a simulated environment presented to him/her via the head-mounted display apparatus.

Throughout the present disclosure, the term "imaging system" used herein relates to equipment configured to produce the images to be displayed to the user via the head-mounted display apparatus. It will be appreciated that the images produced by the imaging system described herein, are employed to present a simulated environment (for example, such as a virtual reality environment, an augmented reality environment, and so forth) to the user of the head-mounted display apparatus, when the head-mounted display apparatus is worn by the user. In such an instance, the head-mounted display apparatus is operable to act as a device (for example, such as a virtual reality headset, a pair of virtual reality glasses, an augmented reality headset, a pair of augmented reality glasses, and the like) for presenting the simulated environment to the user.

It will be appreciated that the imaging system produces the images in real or near real time, thereby, allowing for production of the images, communication of the images from the imaging system to the head-mounted display apparatus, and display of the images via the head-mounted display apparatus, to occur substantially simultaneously. Therefore, the user of the head-mounted display apparatus is provided with a seamless experience of the simulated environment.

For sake of convenience and clarity, the images produced by the imaging system, namely the images to be displayed to the user via the head-mounted display apparatus, are hereinafter referred to as the "output images" of the imaging system.

In one implementation, the imaging system is to be integrated with the head-mounted display apparatus. In such an instance, the imaging system is implemented on (namely, mounted on) the head-mounted display apparatus. Furthermore, in this regard, the first outer camera, the second outer camera and the at least one inner camera may be mounted, for example, on an outer surface of the head-mounted display apparatus, such that the aforesaid cameras face the given real-world scene. Therefore, in such an implementation, the processor may be communicably coupled with the head-mounted display apparatus by way of wires (namely, in a wired manner). Alternatively, the processor may be communicably coupled with the head-mounted display apparatus wirelessly (namely, via a wireless interface).

In another implementation, the imaging system is to be integrated with a remote device. In such an instance, the first outer camera, the second outer camera, the at least one inner camera and the processor are mounted on the remote device, and are therefore external to the head-mounted display apparatus. Furthermore, in such an implementation, the remote device may be positioned within the given real-world scene whereas the user of the head-mounted display apparatus may be positioned away from (namely, at a distance from) the remote device. Therefore, in such an implementation, the processor may be communicably coupled with the head-mounted display apparatus wirelessly (namely, via a wireless interface). Optionally, the remote device is one of: a drone, a robot.

In operation, when the head-mounted display apparatus is worn by the user, the means for detecting the gaze direction of the user detects a direction of gaze of the user's eye(s).

Throughout the present disclosure, the term "means for detecting the gaze direction" used herein relates to specialized equipment for detecting and optionally, following the direction of the user's gaze, when the user views the given real-world scene. It will be appreciated that the gaze direction of the user may be substantially straight, substantially sideways, substantially upwards, substantially downwards, or any combination thereof. Examples of the means for detecting the gaze direction include contact lenses with sensors, F cameras monitoring positions of pupils of the eyes as are well-known in the art. Beneficially, an accurate detection of the user's gaze facilitates the head-mounted display apparatus to closely implement gaze contingency thereon.

Throughout the present disclosure, the terms "first outer camera", "second outer camera" and "at least one inner camera" relate to equipment that is operable to receive and process light from the given real-world scene to capture images of the given real-world scene, hereinafter referred to as the "input images" of the imaging system. Specifically, the input images are to be processed for producing the output images. It will be appreciated that the terms "inner" and "outer" are merely used to describe an arrangement of the aforesaid cameras with respect to each other. In other words, the at least one inner camera is arranged substantially between the first outer camera and the second outer camera.

The first outer camera and the second outer camera are arranged in a manner that the distance between the first outer camera and the second outer camera is equal to or greater than the predefined distance. Optionally, the predefined distance is substantially equal to or greater than a maximum known inter-pupillary distance of human beings. As an example, the predefined distance could be equal to 80 millimetres, 82 millimetres, 84 millimetres, 86 millimeters, 88 millimeters or 90 millimetres. Alternatively, optionally, the predefined distance is equal to an average inter-pupillary distance of human beings. As an example, the predefined distance could be equal to 64 millimetres.

Optionally, a distance between the first outer camera and the at least one inner camera is substantially similar to a distance between the second outer camera and the at least one inner camera. In other words, the at least one inner camera is arranged at equal distances from both the first outer camera and the second outer camera. Therefore, a view of the given real-world scene captured by the at least one inner camera is a substantially intermediate view of the given real-world scene, as compared to views of the given real-world scene that are captured by the first outer camera and the second outer camera. As an example, if the distance between a first outer camera O1 and a second outer camera O2 is equal to 80 millimetres, an inner camera I may be arranged between the first outer camera O1 and the second outer camera O2, at a distance of 40 millimetres from both the first outer camera O1 and the second outer camera O2.

The processor is coupled to the first outer camera, the second outer camera and the at least one inner camera. Furthermore, the processor is communicably coupled to the means for detecting the gaze direction of the user. In an embodiment, the processor is implemented by way of hardware, software, firmware or a combination of these, suitable for controlling the operation of the imaging system. It will be appreciated that the processor is configured to control the operation of the imaging system so as to generate the output images from a perspective of the user's eyes.

The processor is configured to obtain the given inter-pupillary distance of the user with respect to the user's gaze at infinity. It will be appreciated that the given inter-pupillary distance of the user is generally different for different users, owing to possible anatomical variations therebetween.

Optionally, the given inter-pupillary distance of the user is to be obtained manually from the user. In such a case, the user may measure his/her given inter-pupillary distance with respect to his/her gaze at infinity, and input such measure to the imaging system or to the head-mounted display apparatus. In an instance wherein the user inputs his/her given inter-pupillary distance to the head-mounted display apparatus, the processor of the imaging system is configured to receive such input from the head-mounted display apparatus. It will be appreciated that the given inter-pupillary distance of the user could be measured by the user via equipment including, but not limited to, a pupillometer, a ruler, a camera.

Alternatively, optionally, the head-mounted display apparatus comprises means for measuring the given inter-pupillary distance of the user, wherein the processor is configured to obtain the given inter-pupillary distance of the user from said means for measuring the given inter-pupillary distance. In an embodiment, the means for measuring the given inter-pupillary distance of the user comprises a plurality of cameras arranged within the head-mounted display apparatus and a processing module communicably coupled to the plurality of cameras, wherein the plurality of cameras are configured to capture images of the user's eyes, and the processing module is configured to process the captured images of the user's eyes to measure the given inter-pupillary distance of the user. In another embodiment, the means for measuring the given inter-pupillary distance of the user comprises two movable annular disks arranged within the head-mounted display apparatus, a display arranged behind the two movable annular disks, and a processing unit coupled to the two movable annular disks and the display, wherein the processing unit is configured to render an image at the display, instruct the user to adjust the two movable annular disks until he/she views a same perspective of the image through the two movable annular disks, and calculate a distance between the adjusted two movable annular disks to determine the given inter-pupillary distance of the user.

Yet alternatively, optionally, the given inter-pupillary distance of the user is to be obtained from a local data storage or an external database, based upon the user's identification. In such an instance, the given inter-pupillary distance of the user may be pre-stored at the local data storage or the external database, and the processor of the imaging system is configured to obtain the given inter-pupillary distance of the user upon successful authentification of the user's identification. The external database may be, for example, cloud storage. Furthermore, the user's identification is to be obtained and authenticated using the imaging system and/or the head-mounted display apparatus. Examples of the user's identification include, but are not limited to, login credentials, biometric scanning, and voice recognition.

The processor is configured to receive information indicative of the detected gaze direction of the user, from the means for detecting the gaze direction of the user. It will be appreciated that such information is obtained by the means for detecting the gaze direction of the user, and thereafter, communicated from the head-mounted display apparatus to the processor of the imaging system.

The processor is configured to control the first outer camera, the second outer camera and the at least one inner camera to capture the first outer image, the second outer image and the at least one inner image of the given real-world scene, respectively. The first outer image, the second outer image and the at least one inner image (collectively referred to as the "input images") are to be captured substantially simultaneously. It will be appreciated that the input images are captured substantially simultaneously in order to minimize depiction of temporal changes associated with the given real-world scene, within the input images. In other words, since visible attributes of objects and/or entities in the given real-world scene may vary with time, the input images are captured substantially simultaneously, to allow for capturing different views of the given real-world scene at a given time instant.

The processor is configured to process the first outer image and the at least one inner image to generate the first view of the given real-world scene, and process the second outer image and the at least one inner image to generate the second view of the given real-world scene, based upon the given inter-pupillary distance and the detected gaze direction of the user. In such a case, the first view of the given real-world scene relates to a first virtual camera image of the given real-world scene whereas the second view of the given real-world scene relates to a second virtual camera image of the given real-world scene. Therefore, the first view of the given real-world scene and the second view of the given real-world scene are generated by simulating a first virtual camera and a second virtual camera at a first viewpoint and a second viewpoint respectively, wherein the first viewpoint substantially corresponds to a position of a left pupil of the user and the second viewpoint substantially corresponds to a position of a right pupil of the user. It will be appreciated that a distance between the first viewpoint and the second viewpoint is equal to the given inter-pupillary distance of the user, thereby, allowing for the first view and the second view to substantially represent the given real-world scene from the perspective of the user's eyes. Furthermore, whilst generating the first view and the second view, the first virtual camera and the second virtual camera are substantially oriented along the detected gaze direction of the user.

It is to be understood that the term "virtual camera image" used herein relates to an image of the given real-world scene as captured via a virtual camera arranged at a viewpoint within the given real-world scene. Notably, the virtual camera is not a physical camera, but a virtual entity that is controllable to capture the virtual camera image of the given real-world scene from the viewpoint. In other words, the virtual camera is a mere software entity that can be controlled to capture the virtual camera image from the viewpoint, in a manner that a physical camera arranged at the viewpoint would do.

Optionally, the processor employs at least one virtual camera view interpolation algorithm to generate the first view of the given real-world scene and the second view of the given real-world scene. The at least one virtual camera view interpolation algorithm allows for generating the first virtual camera image and the second virtual camera image by estimating views of the given real-world scene that are to be depicted therein, based upon views of the given real-world scene depicted in the first outer image, the second outer image and the at least one inner image. Such virtual camera view interpolation algorithms are well-known in the art.

The first view is to be displayed to a left eye of the user, whilst the second view is to be displayed to a right eye of the user. Specifically, the first view of the given real-world scene depicts a left-perspective view of the given real-world scene, whilst the second view of the given real-world scene depicts a right-perspective view of the given real-world scene, as seen from the user's eyes. It will be appreciated that the first view and the second view of the given real-world scene constitute the output images of the imaging system.

Optionally, the at least one inner camera comprises a first inner camera and a second inner camera, and the at least one inner image comprises a first inner image and a second inner image, the first inner image being captured by the first inner camera, the second inner image being captured by the second inner camera, wherein, when processing at (iv), the processor is configured to generate the first view from the first outer image and the first inner image, and to generate the second view from the second outer image and the second inner image. It will be appreciated that in such a case, the views of the given real-world scene depicted in the first inner image and the first outer image are interpolated to generate the first view. Similarly, the views of the given real-world scene depicted in the second inner image and the second outer image are interpolated to generate the second view.

Optionally, a distance between the first outer camera and the first inner camera is substantially similar to a distance between the second outer camera and the second inner camera.

Optionally, the processor is configured to determine a region of interest in the given real-world scene based upon the gaze direction of the user, wherein, when generating the first and second views at (iv), the processor is configured to digitally crop a portion of at least one of: the first inner image, the second inner image, the first outer image, the second outer image, if the region of interest in the given real-world scene is substantially close to the imaging system. It is to be understood that the term "region of interest" relates to a region of the given real-world scene whereat the user is gazing at a given point of time. Furthermore, the region of interest in the given real-world scene is understood to be substantially close to the imaging system if substantially different perspective views of the given real-world scene are depicted (namely, represented) in the input images. In some implementations, the region of interest in the given real-world scene is understood to be substantially close to the imaging system if a distance therebetween lies within a range of 0.5 metres to 2 metres. For example, in such implementations, the distance between the region of interest and the imaging system may be 0.5 metres, 0.75 metres, 1 metre, 1.25 metres, 1.5 metres, 1.75 metres or 2 metres. In an instance when the region of interest in the given real-world scene is substantially close to the imaging system, the processor implements the aforesaid digital cropping operation to correct perspective error within at least one of the aforesaid input images, thereby, achieving a shifting effect in the first and second views generated upon processing the input images. Furthermore, such a digital cropping operation also allows for maintaining sharpness (namely, focus) at edges of the input images.

In an example, when the region of interest in the given real-world scene is substantially close to the imaging system, the region of interest may be arranged substantially in-between and close to the first inner camera and the second inner camera of the imaging system. Therefore, substantially different perspective views of the region of interest may be depicted in the first inner image and the second inner image. In such a case, a left portion of the first inner image and a right portion of the second inner image may not depict the region of interest therein. Furthermore, since central axes of pixel arrays (of imaging sensors of the first and second inner cameras) corresponding to the aforesaid left portion and the right portion are substantially offset from the camera optical axes of the first inner camera and the second inner camera respectively, there may exist substantial loss of focus (namely, blurriness) within the aforesaid left and right portions. Therefore, the processor may be configured to digitally crop the left portion of the first inner image and the right portion of the second inner image, to correct perspective error within the first and second images, whilst generating the first and second views of the given real-world scene. One such exemplary digital cropping operation has been elucidated in conjunction with FIG. 4B.

Optionally, the processor is configured to determine the region of interest in the given real-world scene based upon the gaze direction of the user, wherein, when generating the first and second views at (iv), the processor is configured to digitally crop a central portion of at least one of: the first inner image, the second inner image, the first outer image, the second outer image, if the region of interest in the given real-world scene is substantially far from the imaging system, and employ said cropped portion whilst generating the first and second views at (iv). Furthermore, the region of interest in the given real-world scene may be understood to be substantially far from the imaging system if substantially similar perspective views of the given real-world scene are depicted in the input images. In other words, if the region of interest in the given real-world scene is substantially far from the imaging system, there exists minimal perspective error within the captured input images, since camera optical axes of the first outer camera, the second outer camera, and the at least one inner camera are substantially parallel. Beneficially, such a digital cropping operation allows for extracting substantially well-focused central portions of the input images, that are to be employed whilst generating the first and second views of the given real-world scene.

In an example, when the region of interest in the given real-world scene is substantially far from the imaging system, the region of interest may be arranged substantially in-between and substantially far from the first inner camera and the second inner camera of the imaging system. Therefore, substantially similar perspective views of the region of interest may be depicted in the first inner image and the second inner image. In such a case, a central portion of the first inner image and a central portion of the second inner image substantially depict the region of interest therein. Furthermore, since central axes of pixel arrays (of imaging sensors of the first and second inner cameras) corresponding to the aforesaid central portions of the first inner image and the second inner image are substantially aligned with the camera optical axes of the first inner camera and the second inner camera respectively, the region of interest may be depicted with substantial sharpness within the aforesaid central portions. Therefore, the processor may be configured to digitally crop the central portion of the first inner image and the central portion of the second inner image, and beneficially utilize such substantially well-focused cropped portions of the region of interest in the given real-world scene, whilst generating the first and second views of the given real-world scene. One such exemplary digital cropping operation has been elucidated in conjunction with FIG. 4A.

In another example, the region of interest in the given real-world scene may be arranged substantially towards a left side of the first outer camera of the imaging system. Therefore, substantially different perspective views of the region of interest may be depicted in the first outer image and the first inner image. In such a case, a central portion of the first outer image and a left portion of the first inner image may depict the region of interest therein. Therefore, the processor may be configured to digitally crop the central portion of the first outer image and the left portion of the first inner image, and beneficially utilize such cropped portions depicting the region of interest in the given real-world scene, whilst generating the first view of the given real-world scene.

In yet another example, the region of interest in the given real-world scene may be arranged substantially towards a right side of the second outer camera of the imaging system. Therefore, substantially different perspective views of the region of interest may be depicted in the second outer image and the second inner image. In such a case, a central portion of the second outer image and a right portion of the second inner image may depict the region of interest therein. Therefore, the processor may be configured to digitally crop the central portion of the second outer image and the right portion of the second inner image, and beneficially utilize such cropped portions depicting the region of interest in the given real-world scene, whilst generating the second view of the given real-world scene.

Additionally or alternatively, optionally, the processor is configured to determine a region of interest in the given real-world scene based upon the gaze direction of the user; and adjust the first inner camera and the second inner camera in a manner that the camera optical axis of the first inner camera and the camera optical axis of the second inner camera point slightly towards each other, if the region of interest in the given real-world scene is substantially close to the imaging system. In other words, the first inner camera and the second inner camera are physically adjusted to tilt towards each other when the region of interest in the given real-world scene is substantially close to the imaging system. Such an adjustment of the first inner camera and the second inner camera allows for reducing (namely, minimizing) perspective error within the first inner image and the second inner image.

Optionally, the imaging system comprises a first actuator and a second actuator associated with the first inner camera and the second inner camera, respectively, wherein the processor is configured to control the first actuator and the second actuator to adjust an extent to which the camera optical axis of the first inner camera and the camera optical axis of the second inner camera point towards each other. Optionally, in this regard, the processor is configured to control the first actuator and the second actuator by generating a first actuation signal and a second actuation signal respectively. Examples of the first actuation signal and the second actuation signal include, but are not limited to, an electric current, a hydraulic pressure, and a mechanical force.

Optionally, the processor is configured to adjust the first outer camera and the second outer camera in a manner that the camera optical axis of the first outer camera and the camera optical axis of the second outer camera point slightly towards each other, if the region of interest in the given real-world scene is substantially close to the imaging system. In other words, the first outer camera and the second outer camera are physically adjusted to tilt towards each other when the region of interest in the given real-world scene is substantially close to the imaging system. Such an adjustment of the first outer camera and the second outer camera allows for reducing perspective error within the first outer image and the second outer image. It will be appreciated that when the region of interest in the given real-world scene is substantially close to the imaging system, perspective error within the first outer image and the second outer image is substantially less than perspective error within the first inner image and the second inner image, due to the arrangement of the first outer camera, the first inner camera, the second inner camera and the second outer camera. Therefore, a degree of tilting of the first and second outer cameras is substantially less than a degree of tilting of the first and second inner cameras.

Optionally, the imaging system further comprises a first tilt shift lens associated with the first inner camera and a second tilt shift lens associated with the second inner camera, wherein the processor is configured to adjust the first tilt shift lens and the second tilt shift lens based upon a position of the region of interest relative to the imaging system. Specifically, the first tilt shift lens and the second tilt shift lens are adjustable to implement perspective control at the first inner camera and the second inner camera respectively, whilst capturing the first inner image and the second inner image. The term "tilt shift lens" relates to an optical element that allows for controlling a perspective of an image captured therethrough. Notably, a given tilt shift lens associated with a given camera is adjustable for implementing either or both of: a tilting function and a shifting function, for the aforesaid perspective control. For implementing the tilting function, the given tilt shift lens is adjusted (namely, rotated relative to an image plane of the given camera) to tilt a focal plane of the given camera in a manner that the tilted focal plane is not perpendicular to a camera optical axis of the given camera (and the tilted focal plane is not parallel to the image plane of the given camera). Therefore, the given tilt shift lens allows for producing a wedge-shaped depth of field that sharply focuses objects (in the given real-world scene) at variable distances from the given camera, by employing the Scheimpflug principle. Furthermore, for implementing the shifting function, the given tilt shift lens is adjusted (namely, moved parallel to the image plane of the given camera) to adjust a position of an imaging circle of the given tilt shift lens relative to the image plane of the given camera. Therefore, the given tilt shift lens is movable for capturing different portions of its imaging circle, at the image plane of the given camera. Consequently, the given tilt shift lens allows for adjusting positions of the objects in the given real-world scene, without moving the given camera.

Optionally, the information indicative of the detected gaze direction includes gaze directions of both the left eye and the right eye of the user, wherein the processor is configured to determine an instantaneous inter-pupillary distance of the user, based upon the given inter-pupillary distance of the user and a convergence angle between the gaze directions of the left and right eyes; and generate the first and second views at (iv) with respect to the instantaneous inter-pupillary distance of the user. In such a case, the gaze directions of the left eye and the right eye of the user appear to converge at the region of interest in the given real-world scene. Therefore, based upon the given inter-pupillary distance of the user and the convergence angle between the gaze directions of the left and right eyes, the instantaneous inter-pupillary distance of the user can be calculated as:

$$IPD_i = IPD_{inf} - 2R\sin(\theta/2)$$

wherein $IPD_i$ is the instantaneous inter-pupillary distance of the user, $IPD_{inf}$ is the given inter-pupillary distance of the user with respect to the user's gaze at infinity, R is a radius of eye rotation and $\theta$ is the convergence angle between the gaze directions of the left and right eyes of the user. In such a case, at (iv) the first view of the given real-world scene and the second view of the given real-world scene are generated by simulating the first virtual camera and the second virtual camera at the first viewpoint and the second viewpoint respectively, wherein the first viewpoint substantially corresponds to the position of the left pupil of the user and the second viewpoint substantially corresponds to the position of the right pupil of the user, and wherein the distance between the first viewpoint and the second viewpoint is equal to the instantaneous inter-pupillary distance of the user.

It will be appreciated that the convergence angle between the gaze directions of the left and right eyes varies with variation in distance between the region of interest in the given real-world scene and the user's eyes. Specifically, if the region of interest in the given real-world scene is substantially close to the user's eyes, the convergence angle between the gaze directions of the left and right eyes is substantially large. Alternatively, if the region of interest in the given real-world scene is substantially far from the user's eyes, the convergence angle between the gaze directions of the left and right eyes is substantially small. For example, a relation of the convergence angle between the gaze directions of the left and right eyes and the distance between the region of interest in the given real-world scene and the user's eyes may be:

$$d = IPD_i / \{2 * \tan(\theta/2)\}$$

wherein d is the distance between the region of interest in the given real-world scene and the user's eyes, $IPD_i$ is the instantaneous inter-pupillary distance of the user, and $\theta$ is the convergence angle between the gaze directions of the left and right eyes of the user.

Optionally, the first outer camera, the second outer camera and the at least one inner camera are to be aligned on a substantially straight line. In such an instance, the camera optical axes of the first outer camera, the second outer camera and the at least one inner camera lie along a same plane. It will be appreciated that the aforesaid alignment of the first outer camera, the second outer camera and the at least one inner camera emulates a substantially straight alignment of the user's eyes. Therefore, the input images captured via such substantially-straight aligned cameras provide substantially-aligned and shifted views of the given real-world scene.

Optionally, the imaging system is to be integrated with the head-mounted display apparatus, and wherein the first outer camera, the second outer camera and the at least one inner camera are to be arranged to lie substantially on a line that is parallel to and in a proximity of a line passing through left and right pupils of the user, when the head-mounted display apparatus is worn by the user. In such a case, amongst the aforesaid parallel lines, the line along which the first outer camera, the second outer camera and the at least one inner camera are to be arranged is closer to the given real-world scene as compared to the line passing through the left and right pupils of the user. Notably, the first outer camera, the second outer camera and the at least one inner camera are arranged proximal to the user's eyes and are aligned substantially parallelly with the user's eyes. Therefore, the input images captured by the first outer camera, the second outer camera and the at least one inner camera depict realistic, aligned views of the given real-world scene, akin to views of the given real-world scene from the user's eyes. Furthermore, in such a case, upon change in a head orientation of the user (for example, such as tilting of the user's head), an orientation of the head-mounted display apparatus also changes. Consequently, an orientation of the imaging system integrated with the head-mounted display apparatus also changes. It will be appreciated that the aforesaid parallel lines continue to remain substantially aligned with each other, even upon change in the head orientation of the user.

Optionally, the imaging system further comprises means for adjusting an orientation of the imaging system, the processor being arranged to be communicably coupled with the head-mounted display apparatus, the head-mounted display apparatus comprising means for tracking the head orientation of the user, wherein the processor is configured to receive, from the head-mounted display apparatus, information indicative of the head orientation of the user; and control the means for adjusting the orientation of the imaging system, based upon the head orientation of the user. In such an instance, the orientation of the imaging system is adjusted to allow for capturing the input images of the given real-world scene, from a perspective of the head orientation of the user. It will be appreciated that such adjustment of the orientation of the imaging system may be employed in the aforementioned implementation wherein the imaging system is to be integrated with the remote device. Examples of the means for tracking the head orientation of the user include, but are not limited to, a gyroscope, and an accelerometer.

Optionally, the means for adjusting the orientation of the imaging system comprises at least one actuator. In an embodiment, the remote device is tilted and/or rotated by the aforesaid means for adjusting the orientation of the imaging system mounted thereon. It will be appreciated that such an implementation is beneficially employed to collectively adjust orientations of the first outer camera, the second outer camera and the at least one inner camera by simply tilting and/or rotating the remote device. In another embodiment, the imaging system is tilted and/or rotated by the aforesaid means. Optionally, in such a case, each of the first outer camera, the second outer camera and the at least one inner camera are tilted and/or rotated by different actuators.

The present disclosure also relates to the method as described above. Various embodiments and variants disclosed above apply mutatis mutandis to the method.

Optionally, in the method, the at least one inner camera comprises the first inner camera and the second inner camera, and the at least one inner image comprises the first inner image and the second inner image, the first inner image being captured by the first inner camera, the second inner image being captured by the second inner camera, wherein the processing at the step (iv) comprises generating the first view from the first outer image and the first inner image, and generating the second view from the second outer image and the second inner image.

More optionally, the method further comprises determining the region of interest in the given real-world scene based upon the gaze direction of the user, wherein the processing at the step (iv) comprises digitally cropping the portion of at least one of: the first inner image, the second inner image, the first outer image, the second outer image, if the region of interest in the given real-world scene is substantially close to the imaging system.

Optionally, the method further comprises determining the region of interest in the given real-world scene based upon the gaze direction of the user; and adjusting the first inner camera and the second inner camera in a manner that the camera optical axis of the first inner camera and the camera optical axis of the second inner camera point slightly towards each other, if the region of interest in the given real-world scene is substantially close to the imaging system.

Optionally, the method further comprises adjusting the first outer camera and the second outer camera in a manner that the camera optical axis of the first outer camera and the camera optical axis of the second outer camera point slightly towards each other, if the region of interest in the given real-world scene is substantially close to the imaging system.

Optionally, in the method, the imaging system further comprises the first tilt shift lens associated with the first inner camera and the second tilt shift lens associated with the second inner camera, wherein the method further comprises adjusting the first tilt shift lens and the second tilt shift lens based upon the position of the region of interest relative to the imaging system.

Optionally, in the method, the information indicative of the detected gaze direction includes gaze directions of both the left eye and the right eye of the user, wherein the method further comprises determining the instantaneous inter-pupillary distance of the user, based upon the given inter-pupillary distance of the user and the convergence angle between the gaze directions of the left and right eyes, wherein the first and second views are generated at the step (iv) with respect to the instantaneous inter-pupillary distance of the user.

Optionally, in the method, the imaging system further comprises means for adjusting the orientation of the imaging system, the head-mounted display apparatus comprising means for tracking the head orientation of the user, wherein the method further comprises receiving, from the head-mounted display apparatus, information indicative of the head orientation of the user; and controlling the means for adjusting the orientation of the imaging system, based upon the head orientation of the user.

DETAILED DESCRIPTION OF THE DRAWINGS

Figure 1A:
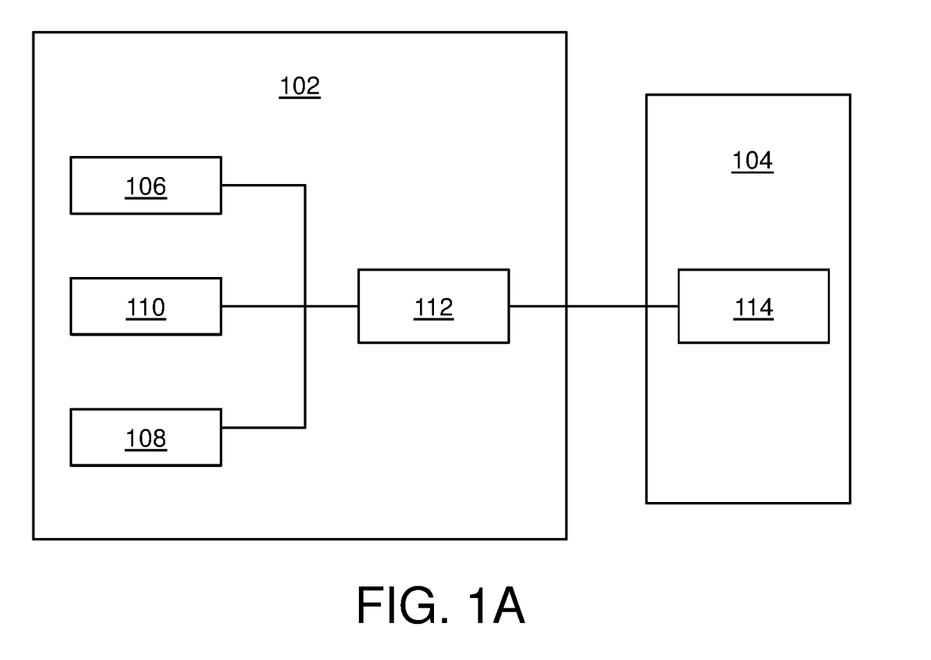
Figure 1B:
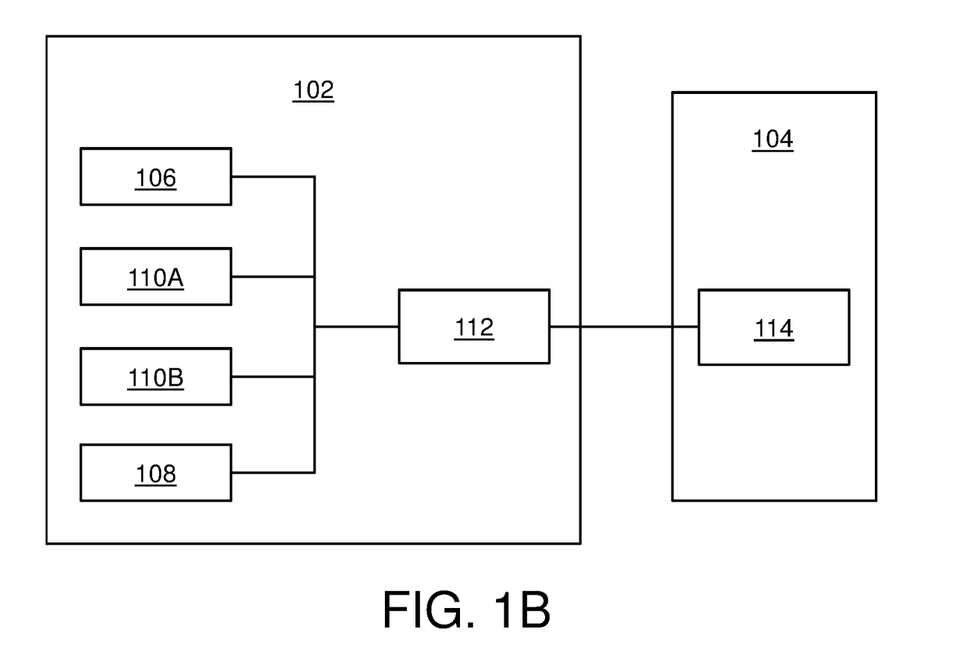
Figure 1C:
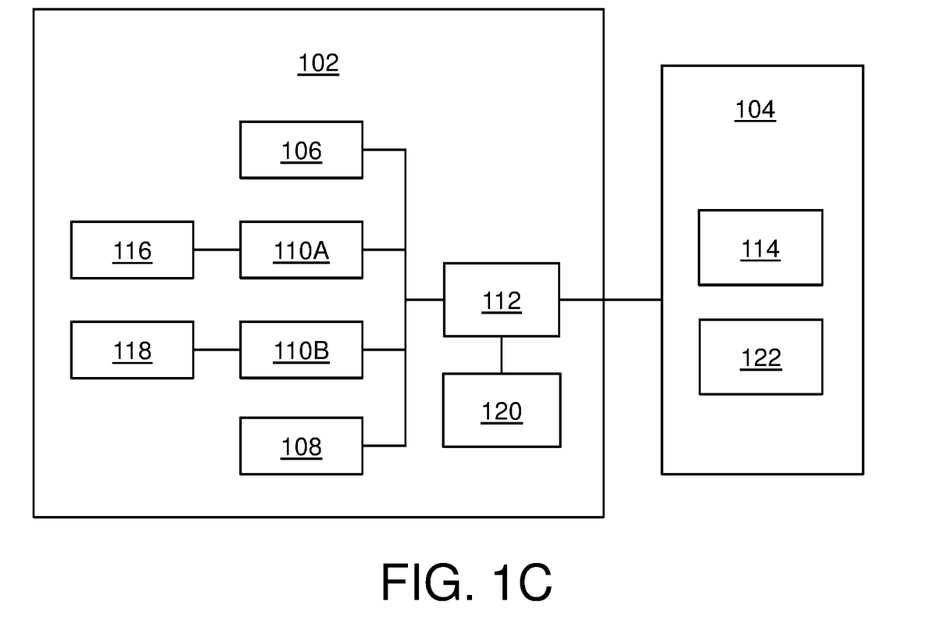

Referring to FIGS. 1A, 1B and 1C, illustrated are block diagrams of an imaging system 102 and a head-mounted display apparatus 104, in accordance with various embodiments of the present disclosure. It may be understood by a person skilled in the art that FIGS. 1A, 1B and 1C depict simplified block diagrams of the imaging system 102 and the head-mounted display apparatus 104 for the sake of clarity only, which should not unduly limit the scope of the claims herein. The person skilled in the art will recognize many variations, alternatives, and modifications of embodiments of the present disclosure.

In FIGS. 1A, 1B and 10, the imaging system 102 produces images to be displayed to a user via the head-mounted display apparatus 104 in real or near real time. The imaging system 102 comprises a first outer camera 106 and a second outer camera 108, at least one inner camera 110, and a processor 112 coupled to the first outer camera 106, the second outer camera 108 and the at least one inner camera 110. The first outer camera 106 and the second outer camera 108 are arranged in a manner that a distance between the first outer camera 106 and the second outer camera 108 is equal to or greater than a predefined distance. The at least one inner camera 110 is arranged substantially between the first outer camera 106 and the second outer camera 108. The head-mounted display apparatus 104 comprises means for detecting a gaze direction 114 of the user. The processor 112 is communicably coupled to said means for detecting the gaze direction 114 of the user. Furthermore, the processor 112 is configured to (i) obtain a given inter-pupillary distance of the user with respect to the user's gaze at infinity, (ii) receive, from said means 114, information indicative of the detected gaze direction of the user, (iii) control the first outer camera 106, the second outer camera 108 and the at least one inner camera 110 to capture a first outer image, a second outer image and at least one inner image of a given real-world scene, respectively, wherein the first outer image, the second outer image and the at least one inner image are to be captured substantially simultaneously; and (iv) process the first outer image and the at least one inner image to generate a first view of the given real-world scene and process the second outer image and the at least one inner image to generate a second view of the given real-world scene, based upon the given inter-pupillary distance and the detected gaze direction of the user, wherein the first view is to be displayed to a left eye of the user, whilst the second view is to be displayed to a right eye of the user.

In FIGS. 1B and 10, the at least one inner camera 110 comprises a first inner camera 110A and a second inner camera 110B, and the at least one inner image comprises a first inner image and a second inner image, the first inner image being captured by the first inner camera 110A, the second inner image being captured by the second inner camera 110B. In such a case, when processing at step (iv), the processor 112 is configured to generate the first view from the first outer image and the first inner image, and to generate the second view from the second outer image and the second inner image.

In FIG. 10, the imaging system 102 further comprises a first tilt shift lens 116 associated with the first inner camera 110A and a second tilt shift lens 118 associated with the second inner camera 110B, wherein the processor 112 is configured to adjust the first tilt shift lens 116 and the second tilt shift lens 118 based upon a position of the region of interest relative to the imaging system 102. The imaging system 102 further comprises means for adjusting an orientation 120 of the imaging system 102, the processor 112 being arranged to be communicably coupled with the head-mounted display apparatus 104, the head-mounted display apparatus 104 comprising means for tracking a head orientation 122 of the user, wherein the processor 112 is configured to receive, from the head-mounted display apparatus 104, information indicative of the head orientation of the user; and control the means for adjusting the orientation 120 of the imaging system 102, based upon the head orientation of the user.

Referring to FIGS. 2A, 2B, 2C and 2D, illustrated are exemplary arrangements of an imaging system 200, in accordance with various embodiments of the present disclosure. It may be understood by a person skilled in the art that FIGS. 2A, 2B, 2C and 2D depict simplified arrangements of the imaging system 200 for the sake of clarity only, which should not unduly limit the scope of the claims herein. The person skilled in the art will recognize many variations, alternatives, and modifications of embodiments of the present disclosure.

In FIGS. 2A, 2B, 2C and 2D, the imaging system 200 comprises a first outer camera 202 and a second outer camera 204, at least one inner camera 206 and a processor (not shown). The at least one inner camera 206 is arranged substantially between the first outer camera 202 and the second outer camera 204. Furthermore, as shown, the first outer camera 202, the second outer camera 204 and the at least one inner camera 206 are aligned on a substantially straight line. Furthermore, in FIGS. 2B and 2D, the at least one inner camera 206 comprises a first inner camera 206A and a second inner camera 206B.

Figure 2A:
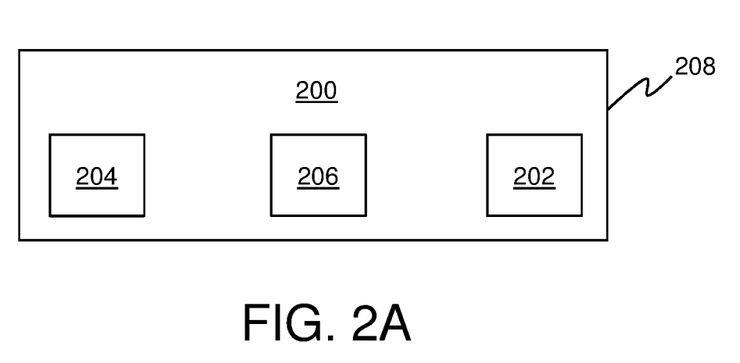
FIGS. 2A, 2B, 2C and 2D illustrate exemplary arrangements of an imaging system, in accordance with various embodiments of the present disclosure.
Figure 2B:
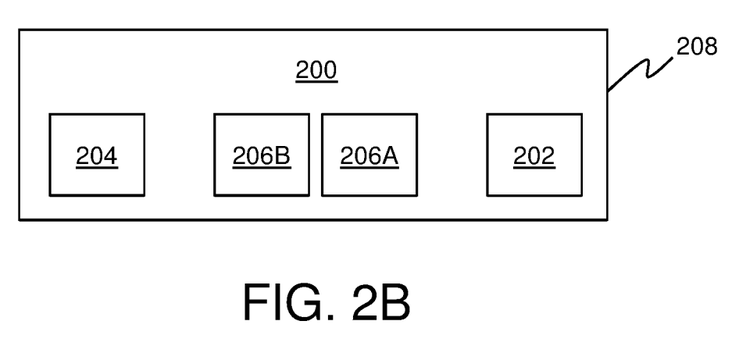
Figure 2C:
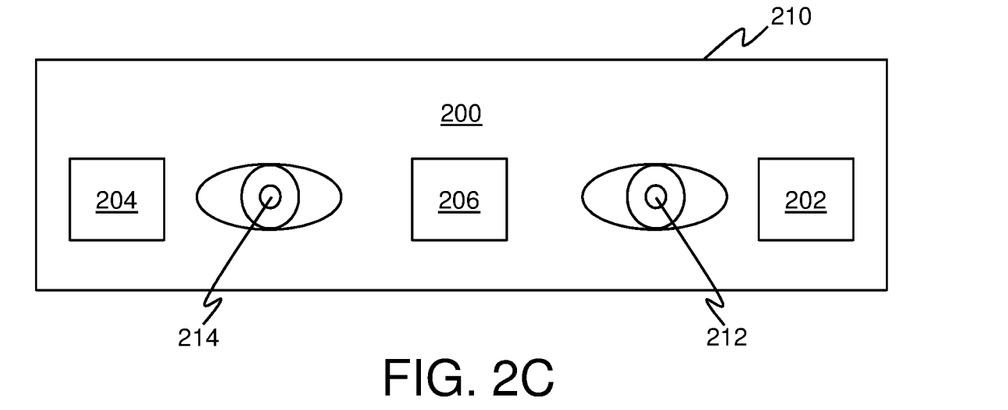
Figure 2D:
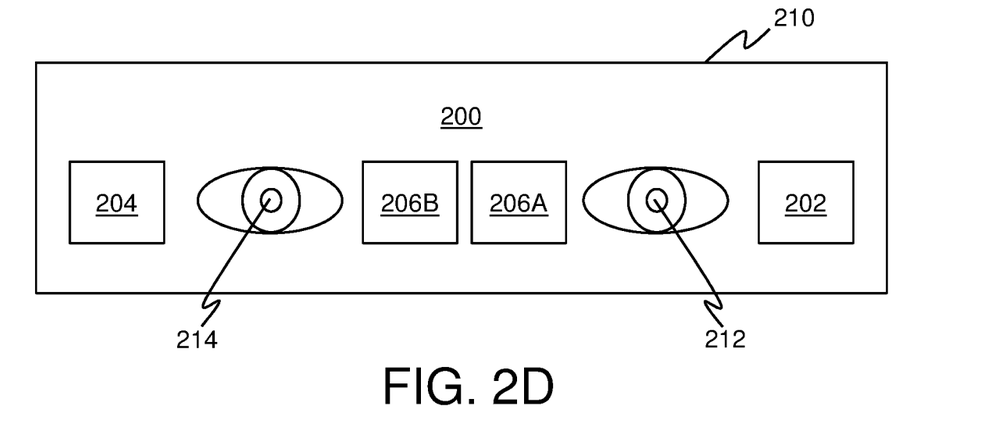

In FIGS. 2A and 2B, the imaging system 200 is integrated with a remote device 208 (for example, such as a drone, a robot). In FIGS. 2C and 2D, the imaging system 200 is integrated with a head-mounted display apparatus 210. In such a case, the first outer camera 202, the second outer camera 204 and the at least one inner camera 206 are to be arranged to lie substantially on a line that is parallel to and in a proximity of a line passing through left and right pupils 212 and 214 respectively of a user, when the head-mounted display apparatus 210 is worn by the user.

Furthermore, in FIGS. 2A and 2C, a distance between the first outer camera 202 and the at least one inner camera 206 is substantially similar to a distance between the second outer camera 204 and the at least one inner camera 206. It will be appreciated that in FIGS. 2B and 2D, a distance between the first outer camera 202 and the first inner camera 206A is substantially similar to a distance between the second outer camera 204 and the second inner camera 206B.

Figure 3:
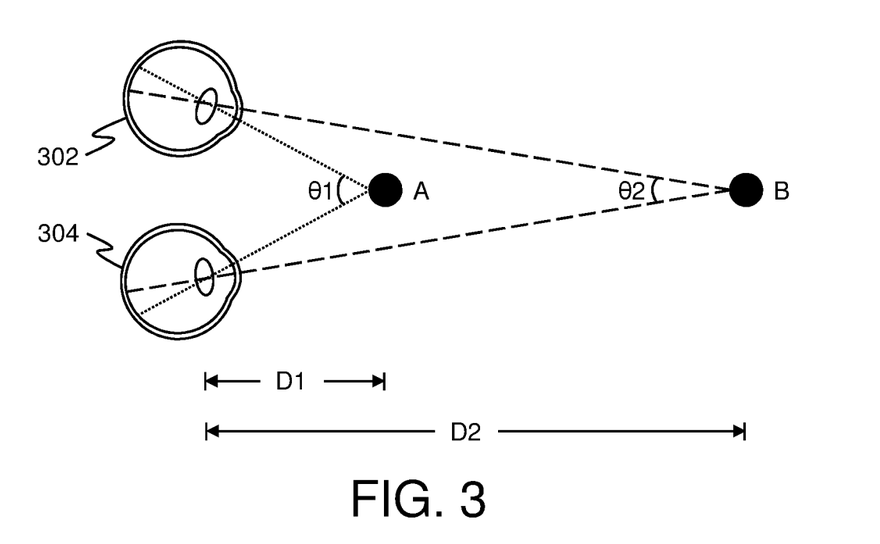
FIG. 3 illustrates convergence of a user's eyes as the user views a given real-world scene, in accordance with an embodiment of the present disclosure.

Referring to FIG. 3, illustrated is convergence of a user's eyes 302 and 304 as the user views a given real-world scene, in accordance with an embodiment of the present disclosure. For example, a left eye of the user is depicted as the eye 302 and a right eye of the user is depicted as the eye 304. As shown, the user views two objects A and B within the given real-world scene. As shown, the object A is substantially close to the user's eyes 302 and 304 (notably, the object A is at a distance D1 from the user's eyes 302 and 304) whereas the object B is substantially far from the user's eyes 302 and 304 (notably, the object B is at a distance D2 from the user's eyes 302 and 304). When the user views the object A, gaze directions of the left eye 302 and the right eye 304 of the user (depicted as dotted lines) converge at an angle θ1. Similarly, when the user views the object B, the gaze directions of the left eye 302 and the right eye 304 of the user (depicted as dashed lines) converge at an angle θ2. As shown, the convergence angle θ1 is substantially greater than the convergence angle θ2. Therefore, an instantaneous inter-pupillary distance of the user when he/she views the object A, is substantially less than an instantaneous inter-pupillary distance of the user when he/she views the object B.

Figure 4A:
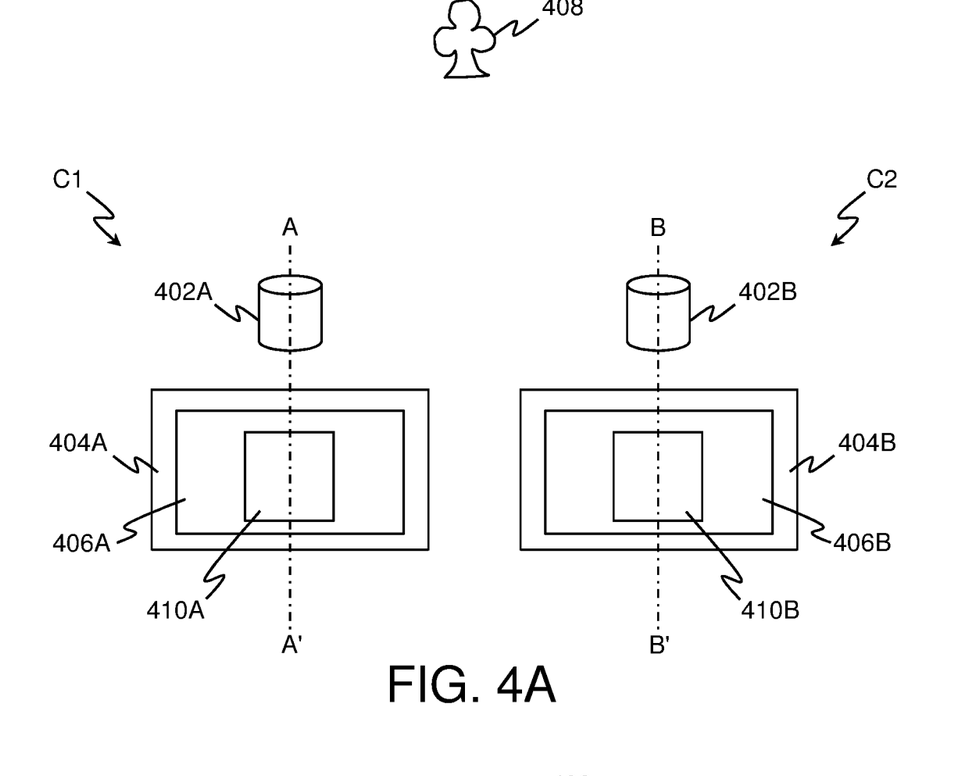
FIGS. 4A and 4B are schematic illustrations of a digital cropping operation implemented by a processor while generating first and second views of a given real-world scene, in accordance with different embodiments of the present disclosure.
Figure 4B:
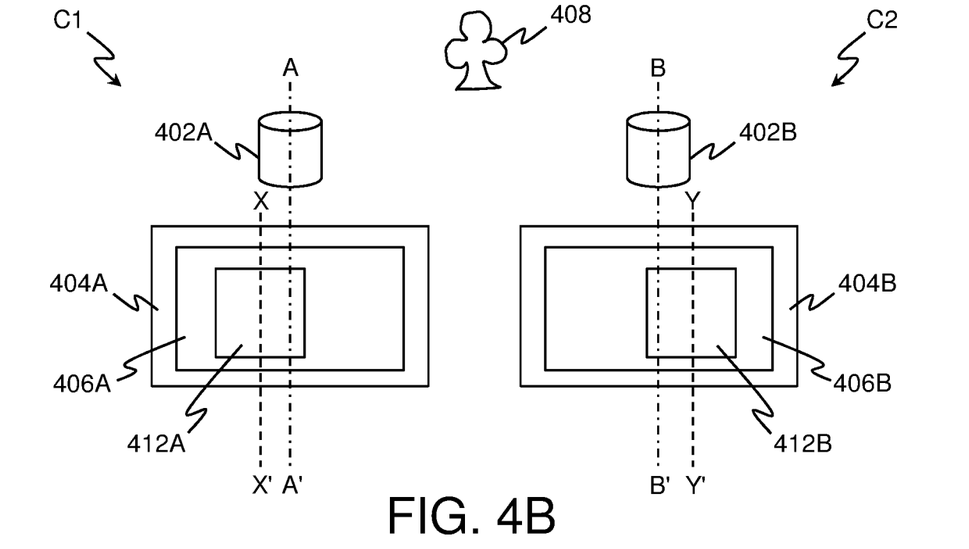

Referring to FIGS. 4A and 4B, illustrated are schematic illustrations of a digital cropping operation implemented by a processor (not shown) while generating first and second views of a given real-world scene, in accordance with different embodiments of the present disclosure. It may be understood by a person skilled in the art that FIGS. 4A and 4B depict a simplified cropping operation for the sake of clarity only, which should not unduly limit the scope of the claims herein. The person skilled in the art will recognize many variations, alternatives, and modifications of embodiments of the present disclosure.

In FIGS. 4A and 4B, there are shown lenses 402A and 402B and imaging sensors 404A and 404B of a first inner camera C1 and a second inner camera C2 respectively. In operation, the processor is configured to control the first inner camera C1 and the second inner camera C2 to capture a first inner image 406A and a second inner image 406B respectively. Furthermore, the processor is configured to determine a region of interest 408 (depicted as a tree) in the given real-world scene based upon a gaze direction of a user.

In FIG. 4A, when generating the first and second views of the given real-world scene, the processor is configured to digitally crop central portions 410A and 410B of the first inner image 406A and the second inner image 406B respectively, since the region of interest 408 in the given real-world scene is substantially far from the first inner camera C1 and the second inner camera C2 of an imaging system (for example, such as the imaging system 102 of FIG. 1B). In such a case, substantially similar perspective views of the region of interest 408 are depicted in the first inner image 406A and the second inner image 406B. Notably, central axes (not shown) of pixel arrays that correspond to the central portions 410A and 410B, are substantially aligned with camera optical axes A-A' and B-B' of the first inner camera C1 and the second inner camera C2 respectively. Therefore, it will be appreciated that the central portions 410A and 410B correspond to substantially well-focused regions of the first inner image 406A and the second inner image 406B. As a result, the cropped central portions 410A and 410B are beneficially utilized whilst generating the first and second views of the given real-world scene. In an example, such a digital cropping operation may be implemented when the region of interest 408 is at an optically infinite distance from the imaging system.

In FIG. 4B, when generating the first and second views of the given real-world scene, the processor is configured to digitally crop portions 412A and 412B of the first inner image 406A and the second inner image 406B respectively, since the region of interest 408 in the given real-world scene is substantially close to the first inner camera C1 and the second inner camera C2 of the imaging system. In such a case, substantially different perspective views of the region of interest 408 are depicted in the first inner image 406A and the second inner image 406B. Specifically, the portions 412A and 412B do not represent the region of interest 408 therein while remaining portions of the first inner image 406A and the second inner image 406B represent the region of interest 408 therein. Furthermore, central axes X-X' and Y-Y' of pixel arrays that correspond to the portions 412A and 412B, are substantially offset from the camera optical axes A-A' and B-B' respectively. Therefore, the portions 412A and 412B correspond to substantially blurred regions of the first inner image 406A and the second inner image 406B. As a result, the cropped portions 412A and 412B are beneficially discarded whilst generating the first and second views of the given real-world scene.

Figure 5:
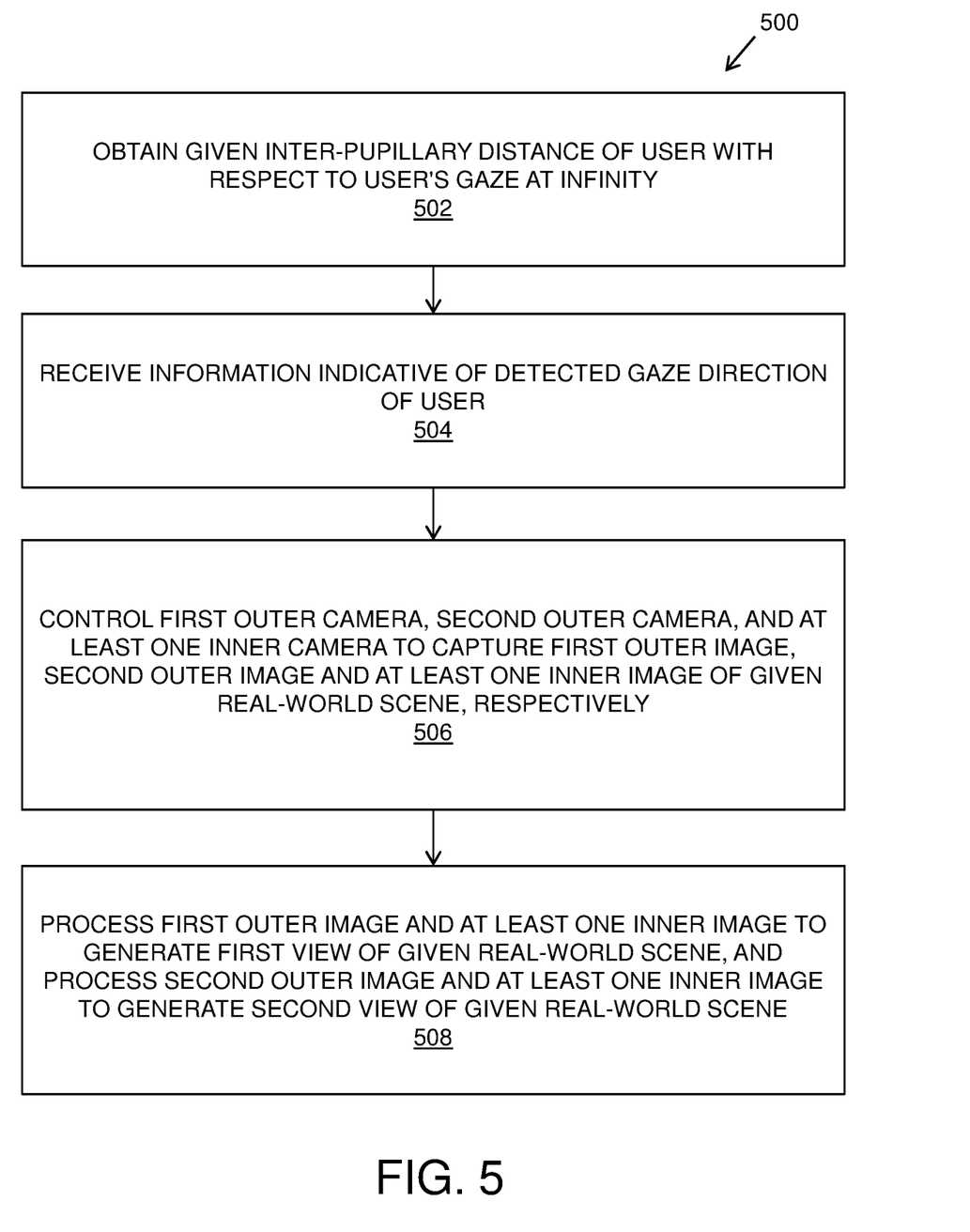
FIG. 5 illustrates steps of a method of producing images for a head-mounted display apparatus, via an imaging system, in accordance with an embodiment of the present disclosure.

Referring to FIG. 5, illustrated are steps of a method 500 of producing images for a head-mounted display apparatus, via an imaging system, in accordance with an embodiment of the present disclosure. At step 502, a given inter-pupillary distance of a user is obtained with respect to the user's gaze at infinity. At step 504, information indicative of the detected gaze direction of the user is received from means for detecting a gaze direction of the user. At step 506, a first outer camera, a second outer camera and at least one inner camera of the imaging system are controlled to capture a first outer image, a second outer image and at least one inner image of a given real-world scene, respectively. The first outer image, the second outer image and the at least one inner image are captured substantially simultaneously. The first outer camera and the second outer camera are arranged in a manner that a distance between the first outer camera and the second outer camera is equal to or greater than a predefined distance, and the at least one inner camera is arranged substantially between the first outer camera and the second outer camera. At step 508, the first outer image and the at least one inner image are processed to generate a first view of the given real-world scene, and the second outer image and the at least one inner image are processed to generate a second view of the given real-world scene, based upon the given inter-pupillary distance and the detected gaze direction of the user. The first view is to be displayed to a left eye of the user, whilst the second view is to be displayed to a right eye of the user.

The steps 502 to 508 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system for producing images to be displayed to a user via a head-mounted display apparatus in real or near real time, the head-mounted display apparatus comprising means for detecting a gaze direction of the user when the head-mounted display apparatus, in operation, is worn by the user, the imaging system comprising:
   a first outer camera and a second outer camera, the first outer camera and the second outer camera being arranged in a manner that a distance between the first outer camera and the second outer camera is equal to or greater than a predefined distance;
   at least one inner camera, the at least one inner camera being arranged at a substantially similar distance between the first outer camera and the second outer camera; and
   a processor coupled to the first outer camera, the second outer camera and the at least one inner camera, the processor being communicably coupled to said means for detecting the gaze direction of the user, wherein the processor is configured to:
   (i) obtain a given inter-pupillary distance of the user with respect to the user's gaze at infinity;
   (ii) receive, from said means, information indicative of the detected gaze direction of the user;
   (iii) control the first outer camera, the second outer camera and the at least one inner camera to capture a first outer image, a second outer image and at least one inner image of a given real-world scene, respectively, wherein the first outer image, the second outer image and the at least one inner image are to be captured substantially simultaneously; and
   (iv) process the first outer image and the at least one inner image to generate a first view of the given real-world scene to be displayed to a left eye of the user, and process the second outer image and the at least one inner image to generate a second view of the given real-world scene to be displayed to a right eye of the user, based upon the given inter-pupillary distance and the detected gaze direction of the user.

2. The imaging system of claim 1, wherein the at least one inner camera comprises a first inner camera and a second inner camera, and the at least one inner image comprises a first inner image and a second inner image, the first inner image being captured by the first inner camera, the second inner image being captured by the second inner camera, wherein, when processing at (iv), the processor is configured to generate the first view from the first outer image and the first inner image, and to generate the second view from the second outer image and the second inner image.

3. The imaging system of claim 2, wherein the processor is configured to determine a region of interest in the given real-world scene based upon the gaze direction of the user, wherein, when generating the first and second views at (iv), the processor is configured to digitally crop a portion of at least one of: the first inner image, the second inner image, the first outer image, the second outer image, if the region of interest in the given real-world scene is substantially close to the imaging system.

4. The imaging system of claim 2, wherein the processor is configured to determine a region of interest in the given real-world scene based upon the gaze direction of the user; and adjust the first inner camera and the second inner camera in a manner that a camera optical axis of the first inner camera and a camera optical axis of the second inner camera point slightly towards each other, if the region of interest in the given real-world scene is substantially close to the imaging system.

5. The imaging system of claim 4, wherein the processor is configured to adjust the first outer camera and the second outer camera in a manner that a camera optical axis of the first outer camera and a camera optical axis of the second outer camera point slightly towards each other, if the region of interest in the given real-world scene is substantially close to the imaging system.

6. The imaging system of claim 4, further comprising a first tilt shift lens associated with the first inner camera and a second tilt shift lens associated with the second inner camera, wherein the processor is configured to adjust the first tilt shift lens and the second tilt shift lens based upon a position of the region of interest relative to the imaging system.

7. The imaging system of claim 1, wherein the first outer camera, the second outer camera and the at least one inner camera are to be aligned on a substantially straight line.

8. The imaging system of claim 1, wherein the imaging system is to be integrated with the head-mounted display apparatus, and wherein the first outer camera, the second outer camera and the at least one inner camera are to be arranged to lie substantially on a line that is parallel to and in a proximity of a line passing through left and right pupils of the user, when the head-mounted display apparatus is worn by the user.

9. The imaging system of claim 1, wherein a distance between the first outer camera and the at least one inner camera is substantially similar to a distance between the second outer camera and the at least one inner camera.

10. The imaging system of claim 1, wherein the information indicative of the detected gaze direction includes gaze directions of both the left eye and the right eye of the user, wherein the processor is configured to determine an instantaneous inter-pupillary distance of the user, based upon the given inter-pupillary distance of the user and a convergence angle between the gaze directions of the left and right eyes; and generate the first and second views at (iv) with respect to the instantaneous inter-pupillary distance of the user.

11. The imaging system of claim 1, further comprising means for adjusting an orientation of the imaging system, the processor being arranged to be communicably coupled with the head-mounted display apparatus, the head-mounted display apparatus comprising means for tracking a head orientation of the user, wherein the processor is configured to receive, from the head-mounted display apparatus, information indicative of the head orientation of the user; and control the means for adjusting the orientation of the imaging system, based upon the head orientation of the user.

12. A method of producing images to be displayed to a user via a head-mounted display apparatus in real or near real time, the head-mounted display apparatus comprising means for detecting a gaze direction of the user when the head-mounted display apparatus, in operation, is worn by the user, wherein the method is implemented via an imaging system, the method comprising:

(i) obtaining a given inter-pupillary distance of the user with respect to the user's gaze at infinity;
(ii) receiving, from said means, information indicative of the detected gaze direction of the user;
(iii) controlling a first outer camera, a second outer camera and at least one inner camera of the imaging system to capture a first outer image, a second outer image and at least one inner image of a given real-world scene, respectively, wherein the first outer image, the second outer image and the at least one inner image are captured substantially simultaneously, the first outer camera and the second outer camera being arranged in a manner that a distance between the first outer camera and the second outer camera is equal to or greater than a predefined distance, the at least one inner camera being arranged substantially between the first outer camera and the second outer camera; and
(iv) processing the first outer image and the at least one inner image to generate a first view of the given real-world scene to be displayed to a left eye of the user, and processing the second outer image and the at least one inner image to generate a second view of the given real-world scene to be displayed to a left eye of the user, based upon the given inter-pupillary distance and the detected gaze direction of the user.

13. The method of claim 12, wherein the at least one inner camera comprises a first inner camera and a second inner camera, and the at least one inner image comprises a first inner image and a second inner image, the first inner image being captured by the first inner camera, the second inner image being captured by the second inner camera, wherein the processing at the step (iv) comprises generating the first view from the first outer image and the first inner image, and generating the second view from the second outer image and the second inner image.

14. The method of claim 13, further comprising determining a region of interest in the given real-world scene based upon the gaze direction of the user, wherein the processing at the step (iv) comprises digitally cropping a portion of at least one of: the first inner image, the second inner image, the first outer image, the second outer image, if the region of interest in the given real-world scene is substantially close to the imaging system.

15. The method of claim 13, further comprising determining a region of interest in the given real-world scene based upon the gaze direction of the user; and adjusting the first inner camera and the second inner camera in a manner that a camera optical axis of the first inner camera and a camera optical axis of the second inner camera point slightly towards each other, if the region of interest in the given real-world scene is substantially close to the imaging system.

16. The method of claim 15, further comprising adjusting the first outer camera and the second outer camera in a manner that a camera optical axis of the first outer camera and a camera optical axis of the second outer camera point slightly towards each other, if the region of interest in the given real-world scene is substantially close to the imaging system.

17. The method of claim 15, wherein the imaging system further comprises a first tilt shift lens associated with the first inner camera and a second tilt shift lens associated with the second inner camera, wherein the method further comprises adjusting the first tilt shift lens and the second tilt shift lens based upon a position of the region of interest relative to the imaging system.

18. The method of claim 12, wherein the information indicative of the detected gaze direction includes gaze directions of both the left eye and the right eye of the user, wherein the method further comprises determining an instantaneous inter-pupillary distance of the user, based upon the given inter-pupillary distance of the user and a convergence angle between the gaze directions of the left and right eyes, wherein the first and second views are generated at the step (iv) with respect to the instantaneous inter-pupillary distance of the user.

19. The method of claim 12, wherein the imaging system further comprises means for adjusting an orientation of the imaging system, the head-mounted display apparatus comprising means for tracking a head orientation of the user, wherein the method further comprises receiving, from the head-mounted display apparatus, information indicative of the head orientation of the user; and controlling the means for adjusting the orientation of the imaging system, based upon the head orientation of the user.

* * * * *